US012573231B2

(12) United States Patent
Thomas et al.

(10) Patent No.: US 12,573,231 B2
(45) Date of Patent: Mar. 10, 2026

(54) CONTROLLING ROLLABLE DISPLAY DEVICES BASED ON FINGERPRINT INFORMATION AND TOUCH INFORMATION

(71) Applicant: QUALCOMM Incorporated, San Diego, CA (US)

(72) Inventors: Gordon Thomas, Encinitas, CA (US); Deep Bhatia, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 469 days.

(21) Appl. No.: 18/146,192

(22) Filed: Dec. 23, 2022

(65) Prior Publication Data

US 2024/0212387 A1     Jun. 27, 2024

(51) Int. Cl.
*G06V 40/12*          (2022.01)
*G06F 1/16*           (2006.01)
*G06F 3/0488*         (2022.01)

(52) U.S. Cl.
CPC ........ *G06V 40/1365* (2022.01); *G06F 1/1652* (2013.01); *G06F 1/1679* (2013.01); *G06F 3/0488* (2013.01); *G06V 40/1341* (2022.01)

(58) Field of Classification Search
CPC ............ G06V 40/1365; G06V 40/1341; G06F 1/1652; G06F 1/1679; G06F 3/0488
USPC ........................................ 382/115
See application file for complete search history.

(56) References Cited

U.S. PATENT DOCUMENTS 10,181,072 B2 *  1/2019  Baek .................... A61B 5/0205
11,009,912 B2    5/2021  Kim et al.

2010/0045705 A1 *  2/2010  Vertegaal .............. G06F 1/1613
                                                  345/173
2013/0127748 A1 *  5/2013  Vertegaal .............. G06F 3/0485
                                                  345/173
2015/0309611 A1 *  10/2015  Vertegaal ........... G06Q 30/0209
                                                  345/174
2017/0011714 A1 *  1/2017  Eim ...................... G06F 1/1677
2017/0075701 A1 *  3/2017  Ricci ................ G08G 1/096805

(Continued)

FOREIGN PATENT DOCUMENTS

WO          2021125379 A1      6/2021
WO          2021246800 A1     12/2021
WO          2022119339 A1      6/2022

OTHER PUBLICATIONS

International Search Report and Written Opinion—PCT/US2023/036431—ISA/EPO—Feb. 20, 2024.

*Primary Examiner* — William D Titcomb
(74) *Attorney, Agent, or Firm* — QUALCOMM Incorporated

(57)          ABSTRACT

Various aspects of the present disclosure generally relate to wireless communication. In some aspects, a controller of a user device having a rollable display device may obtain fingerprint information associated with a user interaction with a contact area of the rollable display device. The controller may obtain touch information associated with the user interaction with the contact area of the rollable display device. The controller may output, based on the fingerprint information and the touch information, actuation information that causes actuation of a display extending component of the rollable display device to change an extension state of the rollable display device. Numerous other aspects are described.

30 Claims, 8 Drawing Sheets

(56)        References Cited

U.S. PATENT DOCUMENTS

| | | | | |
|---|---|---|---|---|
| 2017/0224140 | A1* | 8/2017 | Vertegaal | G06F 3/04883 |
| 2020/0074133 | A1* | 3/2020 | Cheng | G06F 3/044 |
| 2020/0225848 | A1* | 7/2020 | Yoon | G06F 3/041 |
| 2023/0007118 | A1 | 1/2023 | Kim et al. | |
| 2023/0027063 | A1* | 1/2023 | Wang | G06F 1/1656 |
| 2023/0086442 | A1* | 3/2023 | Van Ostrand | G06V 40/1306 |
| | | | | 345/173 |
| 2023/0097982 | A1 | 3/2023 | Kim et al. | |
| 2023/0245608 | A1 | 8/2023 | Park et al. | |
| 2024/0029227 | A1* | 1/2024 | Pallerla | G06F 3/0488 |
| 2024/0121330 | A1* | 4/2024 | Lombardi | H04M 1/0269 |

\* cited by examiner

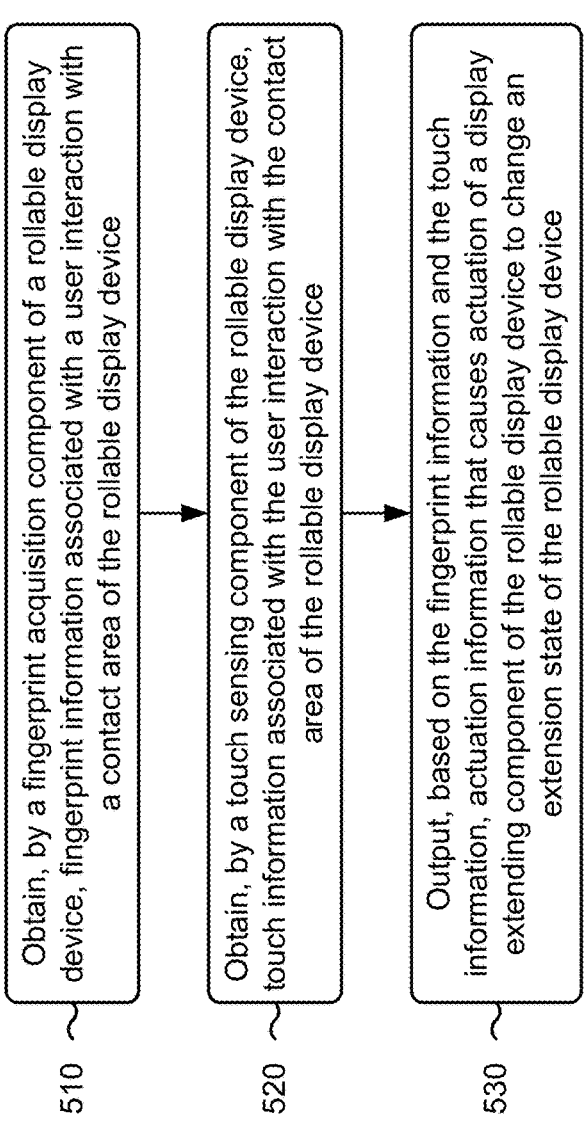

510 — Obtain, by a fingerprint acquisition component of a rollable display device, fingerprint information associated with a user interaction with a contact area of the rollable display device 520 — Obtain, by a touch sensing component of the rollable display device, touch information associated with the user interaction with the contact area of the rollable display device 530 — Output, based on the fingerprint information and the touch information, actuation information that causes actuation of a display extending component of the rollable display device to change an extension state of the rollable display device

CONTROLLING ROLLABLE DISPLAY DEVICES BASED ON FINGERPRINT INFORMATION AND TOUCH INFORMATION

FIELD OF THE DISCLOSURE

Aspects of the present disclosure generally relate to display devices and, for example, control of a rollable display panel of a rollable display device.

BACKGROUND

A user device may include a display device. The display device may be an output device for presentation of information in visual form. For example, the display device may include an output surface and a projecting mechanism that displays text and/or graphic images using a cathode ray tube (CRT), a liquid crystal display (LCD), a light-emitting diode (LED) display, an organic LED (OLED) display, a gas plasma display, or another image projection technology.

SUMMARY

Some aspects described herein relate to a controller of a user device for wireless communication. The user device may include a rollable display device. The controller of a user device may include a memory and one or more processors coupled to the memory. The one or more processors may be configured to obtain fingerprint information associated with a user interaction with a contact area of the rollable display device. The one or more processors may be configured to obtain touch information associated with the user interaction with the contact area of the rollable display device. The one or more processors may be configured to output, based on the fingerprint information and the touch information, actuation information that causes actuation of a display extending component of the rollable display device to change an extension state of the rollable display device.

Some aspects described herein relate to a method for controlling a rollable display device. The method may include obtaining, by a fingerprint acquisition component of the rollable display device, fingerprint information associated with a user interaction with a contact area of the rollable display device. The method may include obtaining, by a touch sensing component of the rollable display device, touch information associated with the user interaction with the contact area of the rollable display device. The method may include outputting, based on the fingerprint information and the touch information, actuation information that causes actuation of a display extending component of the rollable display device to change an extension state of the rollable display device.

Some aspects described herein relate to a non-transitory computer-readable medium that stores a set of instructions for wireless communication by a controller of a user device having a rollable display device. The set of instructions, when executed by one or more processors of the controller, may cause the controller to obtain fingerprint information associated with a user interaction with a contact area of the rollable display device. The set of instructions, when executed by one or more processors of the controller, may cause the controller to obtain touch information associated with the user interaction with the contact area of the rollable display device. The set of instructions, when executed by one or more processors of the controller, may cause the controller to output, based on the fingerprint information and the touch information, actuation information that causes actuation of a display extending component of the rollable display device to change an extension state of the rollable display device.

Some aspects described herein relate to an apparatus for wireless communication. The apparatus may include means for obtaining fingerprint information associated with a user interaction with a contact area of a rollable display device. The apparatus may include means for obtaining touch information associated with the user interaction with the contact area of the rollable display device. The apparatus may include means for outputting, based on the fingerprint information and the touch information, actuation information that causes actuation of a display extending component of the rollable display device to change an extension state of the rollable display device.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a controller, in accordance with the present disclosure.

DETAILED DESCRIPTION

Figure 1:
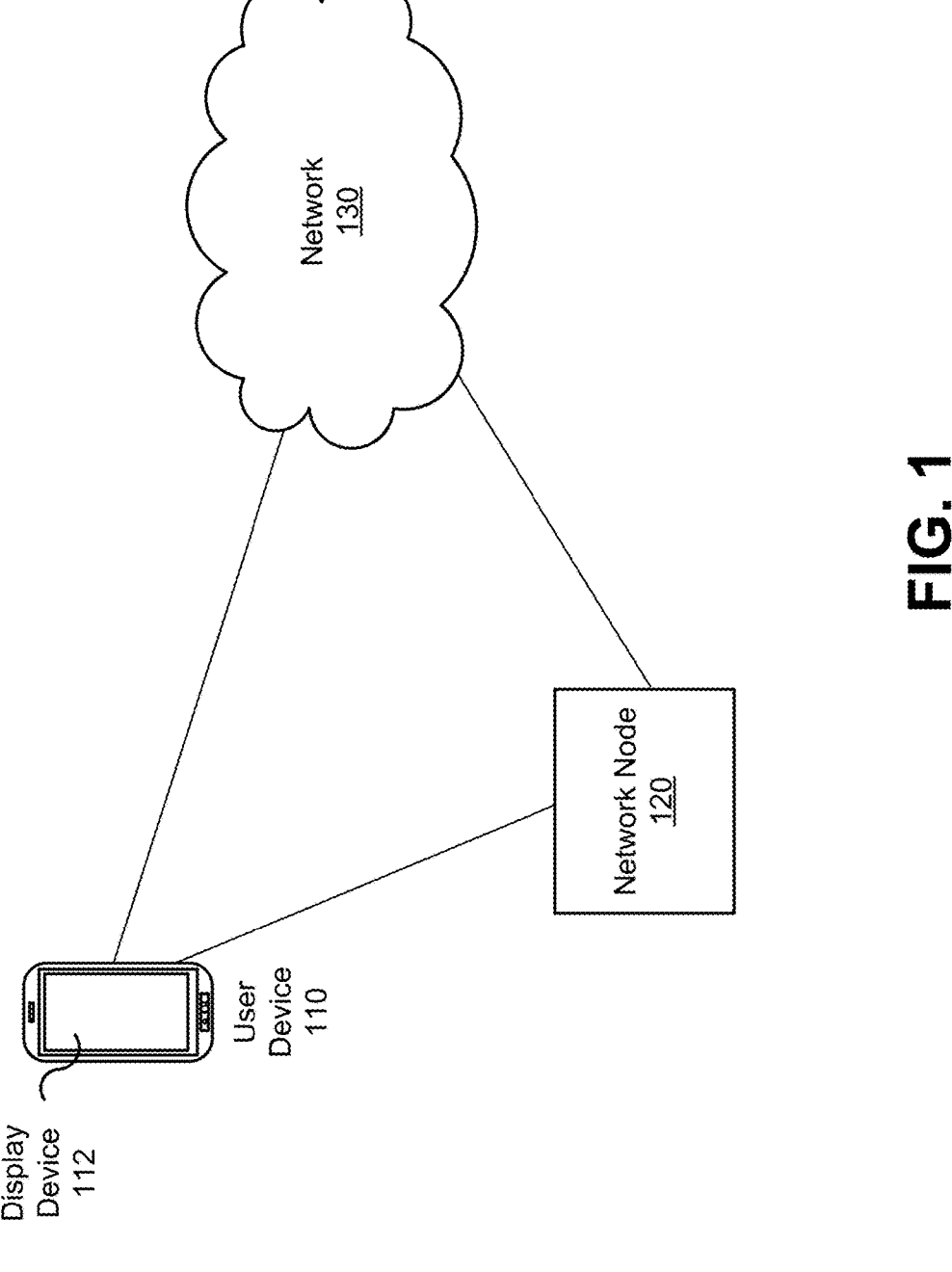
FIG. 1 is a diagram of an example environment in which a user device having a rollable display device described herein may be implemented.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user device may include a display device for presenting visual content to a user. In some cases, the display device may be a rollable display device that includes a rollable display panel that can be extended and/or retracted between a first position and a second position to adjust (e.g., increase or decrease) a viewable portion of the display panel. The viewable portion of the display device may be a portion of the display device that extends from, and/or is positioned outside of, an internal housing of the user device.

The user device may include a display extending component configured to change an extension state of the display device. The extension state may include an unextended state and any number of extended states. For example, the rollable display panel may be extended a portion of an extendable distance and/or fully extended. In some aspects, the display extending component may include a mechanical device (e.g., a motor, a set of rollers, and/or the like) that may be actuated to extend and/or retract the rollable display panel. In some cases, the mechanical device may be calibrated to enable a controller of the user device to control a size of the viewable portion of the rollable display panel, to enable the rollable display panel to be uniformly extended and/or retracted (e.g., to enable a lower edge and an upper edge of the rollable display panel to extend at the same rate), and/or the like.

Generally, it may be desirable to provide a mechanism by which a user of the user device may cause the display device to be extended and/or retracted. In some cases, a user device may be configured to obtain fingerprint information from a user to transition the display device from a first lock mode (e.g., locked) to a second mode (e.g., unlocked) and/or vice versa. In some cases, the user may wish to cause the display device to be extended and/or retracted in connection with locking and/or unlocking the display device. In some other cases, the user may wish to lock or unlock the display device independently of causing the display device to be extended and/or retracted. Thus, using the fingerprint information to both change the lock mode and the extension state may result in a limiting user experience.

Some implementations described herein enable a user of a user device to cause a lock mode of a display device of the user device to be changed independently of causing an extension state of the display device to be changed, while minimizing user effort in providing separate input interactions associated with the lock mode and the extension state, respectively. For example, a controller associated with the display device may obtain, by a fingerprint acquisition component of the display device, fingerprint information associated with a user interaction with a contact area of the display device. The controller may obtain, by a touch sensing component of the display device, touch information associated with the user interaction with the contact area of the display device. The controller may output, based on the fingerprint information and the touch information, actuation information that causes actuation of a display extending component of the display device to change an extension state of the display device. In some aspects, the controller may output the actuation information based on the touch information satisfying a touch condition (e.g., a force threshold associated with a pressure applied by a user's finger to the display device and/or detection of a swipe of a user's finger on the display device). The controller may output the mode information based on the fingerprint information satisfying a fingerprint condition.

In this way, a user of the user device may independently provide input to cause a lock mode to be changed and an extension state to be changed. For example, the user may touch a contact area on the display device and, based on obtained fingerprint information, the lock mode may be changed. While touching the same contact area, the user may apply pressure to the display device, which may cause an extension state to be changed. Thus, a user may use what is effectively the same input motion to achieve both changes, while an adjustment of the pressure applied by the user may result in one versus both changes, or vice versa, to be caused. As a result, some aspects described herein may improve user experience with user devices having rollable display devices.

FIG. 1 is a diagram of an example environment 100 in which systems and/or methods described herein may be implemented. As shown in FIG. 1, environment 100 may include a user device 110, a network node 120, and a network 130. Devices of environment 100 may interconnect via wired connections, wireless connections, or a combination of wired and wireless connections.

User device 110 includes one or more devices capable of including one or more display devices 112 having rollable display panels described herein. For example, user device 110 may include one or more devices capable of receiving, generating, storing, processing, and/or providing information associated with one or more rollable display panels described herein. More specifically, user device 110 may include a communication and/or computing device, such as a mobile phone (e. g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Similar to user device 110, the network node 120 includes one or more devices capable of receiving, generating, storing, processing, and/or providing information associated with one or more rollable display panels described herein. For example, the network node 120 may include a base station (a Node B, a gNB, and/or a 5G node B (NB), among other examples), a UE, a relay device, a network controller, an access point, a transmit receive point (TRP), an apparatus, a device, a computing system, one or more components of any of these, and/or another processing entity configured to perform one or more aspects of the techniques described herein. For example, the network node 120 may be an aggregated base station and/or one or more components of a disaggregated base station.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
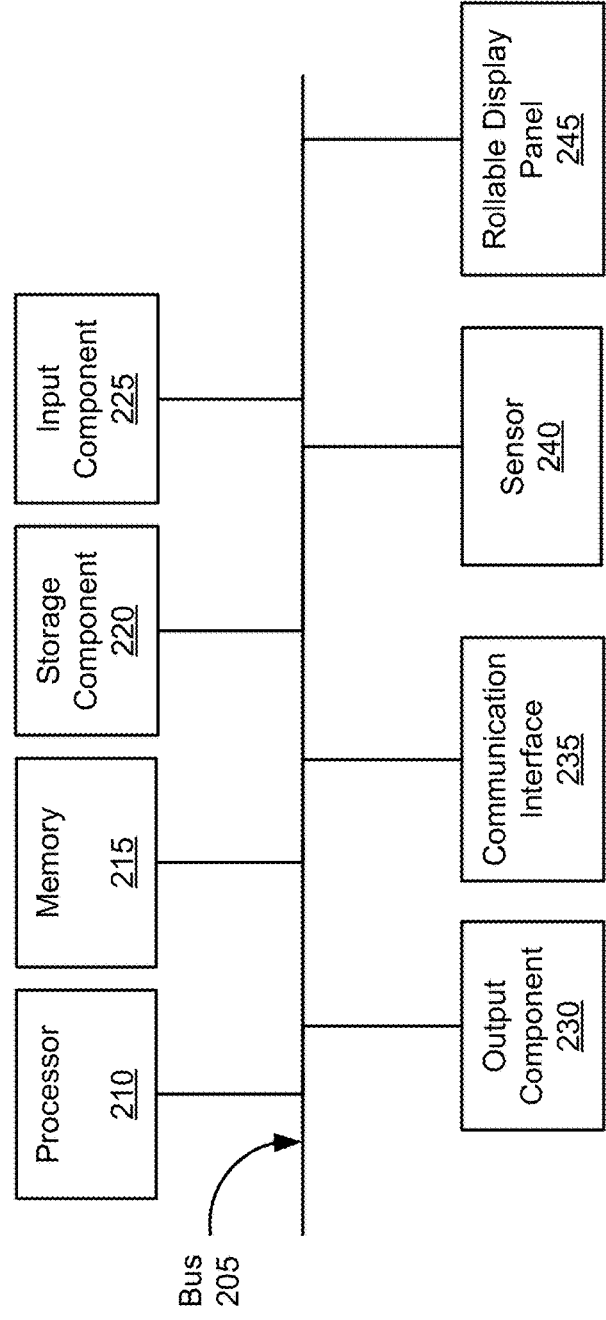
FIG. 2 is a diagram illustrating example components of a user device, in accordance with the present disclosure.

FIG. 2 is a diagram illustrating example components of a device 200, in accordance with the present disclosure. Device 200 may correspond to a user device 110 and/or a network node 120. In some aspects, the user device 110 and/or the network node 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, and/or a rollable display panel 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

In some aspects, sensor 240 may include a fingerprint acquisition component. The fingerprint acquisition component may include a type of fingerprint sensor that is configured to obtain fingerprint information. In some implementations, for example, the fingerprint acquisition component may include an ultrasonic fingerprint sensor, and/or an optical fingerprint sensor, among other examples. In some aspects, sensor 240 may include a touch sensing component. The touch sensing component may include any type of sensor configured to obtain touch information (e.g., force measurements, pressure measurements, and/or gesture measurements). In some implementations, for example, the touch sensing component may include a capacitive input sensor, among other examples. A force measurement and/or a pressure measurement may be a measurement associated with an amount of force applied by the user to the display device (e.g., by the user's fingertip). A gesture measurement may be a measurement associated with a moving touch to the display device (e.g., a swipe).

Rollable display panel 245 may include an output surface capable of using image projection technology (e.g., liquid crystal display (LCD), light-emitting diode (LED), organic LED (OLED), gas plasma, and/or the like) to present content in visual form. The rollable display panel 245 may comprise a flexible structure that allows at least a portion of the rollable display panel 245 to extend from and/or retract into an interior portion of a device (e.g., user device 110 and/or wireless communication device 120) to vary a size of the output surface that is used to present content in visual form, as described herein.

Device 200 may perform one or more processes described herein. In some aspects, for example, a "controller" of a user device may refer to any one or more of the bus 205, the processor 210, the memory 215, the storage component 220, the input component 225, the output component 230, and/or the communication interface 235. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for obtaining, by a fingerprint acquisition component of a display device, fingerprint information associated with a user interaction with a contact area of the display device; means for obtaining, by a touch sensing component of the display device, touch information associated with the user interaction with the contact area of the display device; means for outputting, based on the fingerprint information and the touch information, actuation information that causes actuation of a display extending component of the display device to change an extension state of the display device; or the like. In some aspects, such means may include one or more components of device 200 described in connection with FIG. 2, such as bus 205, processor 210, memory 215, storage component 220, input component 225, output component 230, communication interface 235, a sensor 240, and/or rollable display panel 245.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
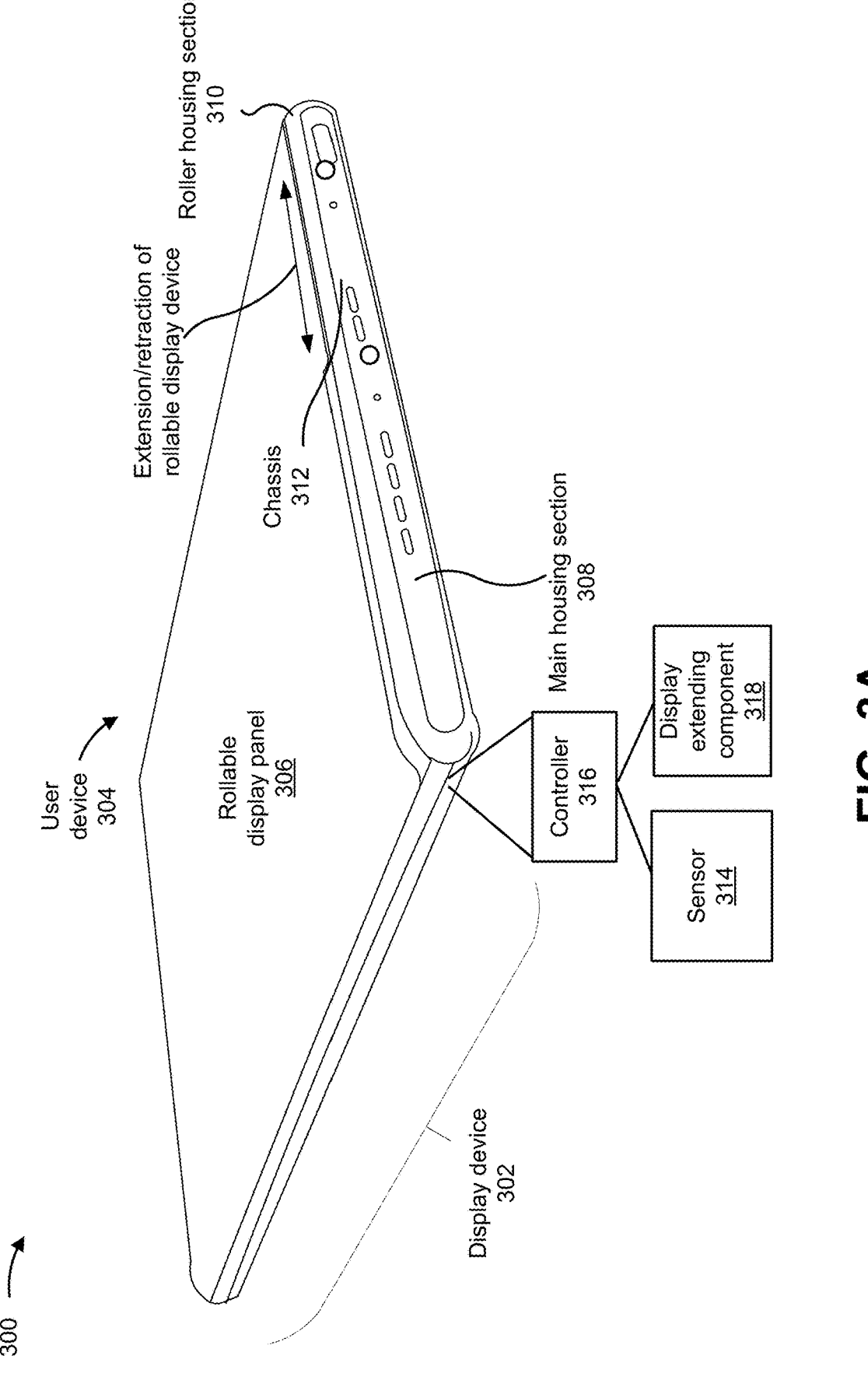
FIGS. 3A and 3B are diagrams illustrating an example associated with a rollable display panel of a display device, in accordance with the present disclosure.
Figure 3B:
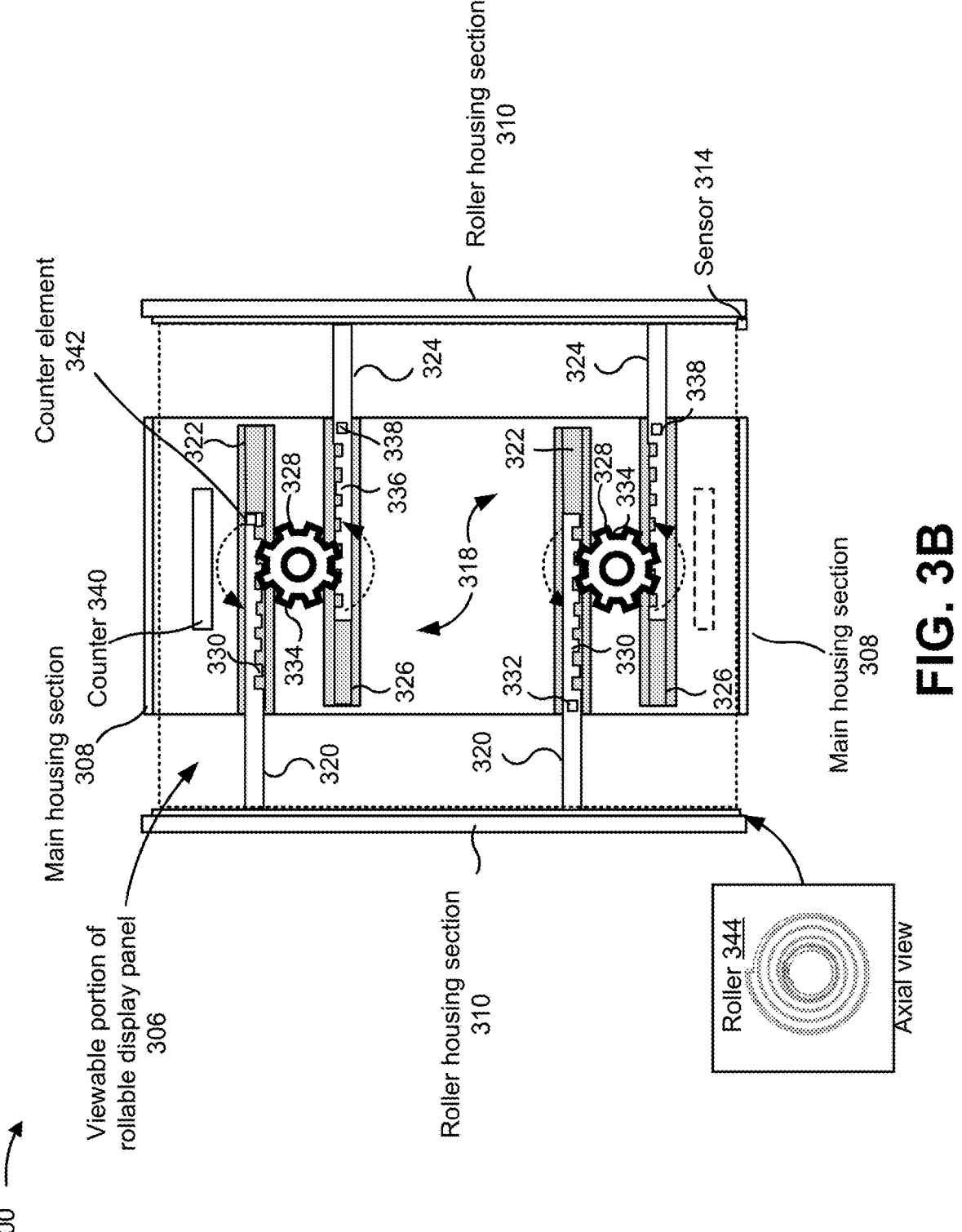

FIGS. 3A and 3B are diagrams illustrating an example 300 associated with a rollable display panel of a display device, in accordance with the present disclosure. As shown in FIGS. 3A and 3B, a display device 302 (e.g., display device 112) of a user device 304 includes a rollable display panel 306, a main housing section 308, a roller housing section 310, a chassis 312, a sensor 314, a controller 316, and a display extending component 318. The display device 304 may be configured to adjust the rollable display panel 306. In some cases, the controller 316 causes the display extending component 318 to cause the rollable display panel 306 to transition from a fully retracted position to an extended position. In some aspects, the fully retracted position corresponds to a smallest size of the viewable portion of the rollable display panel 306. For example, in the fully retracted position, the roller housing section 310 may be positioned adjacent to an end of the main housing section 308.

In some aspects, the extended position corresponds to a size of a viewable portion of the rollable display panel 306 that is greater than the smallest size of the viewable portion. For example, the extended position may correspond to a fully extended position (e.g., a size of the viewable portion is a maximum size), a partially extended position (e.g., a size of the viewable portion is greater than the smallest size and/or less than the maximum size), and/or the like.

As shown in FIG. 3B, the display extending component 318 may be configured to permit the rollable display panel 306 to extend from, and/or retract into, the inner housing of the display device 302. The display extending component 318 may include a first set of slide rails 320, a first set of slide tracks 322, a second set of slide rails 324, a second set of slide tracks 326, and a set of gears 328. The first set of slide rails 320, which may extend from an inner surface of the roller housing section 310, may be configured to be slidably received by the first set of slide tracks 322, which may be provided (e.g., as slots) in an interior surface of the user device 304. Each of the first set of slide rails 320 may include a first plurality of teeth 330 and a first stop element 332. The first plurality of teeth 330 may be configured to engage gear teeth 334 of the set of gears 328. In some aspects, the set of gears 328 are provided within a hollow interior of the user device 304. Each of the set of gears 328 may be configured to rotate about a rotational axis that is perpendicular to a lateral plane of the user device 304. The first stop element 332 may be configured to prevent the first set of slide rails 320 from being separated from the first set of slide tracks 322.

Similarly, the second set of slide rails 324, which may extend from inner surface of the roller housing section 310 that is opposite to the inner surface from which the first set of slide rails 320 extend, may be configured to be slidably received by the second set of slide tracks 326. The second set of slide tracks 326 may be provided in the hollow interior of the user device 304. Each of the second set of slide rails 324 may include a second plurality of teeth 336 and a second stop element 338. The second plurality of teeth 336 may be configured to engage the gear teeth 334 of the set of gears 328. The second stop element 338 may be configured to prevent the second set of slide rails 324 from being separated from the second set of slide tracks 326.

The rollable display panel 306 may be attached to an upper surface of the first set of slide rails 320 and/or the second set of slide rails 324. For example, the rollable display panel 306 may be laminated, glued, and/or the like to the upper surface of the first set of slide rails 320 and/or the second set of slide rails 324. The display extending component 318 may be configured to adjust the position of the first set of slide rails 320 and/or the second set of slide rails 324 within the first set of slide tracks 322 and/or the second set of slide tracks 326, respectively, by equal distances to cause the rollable display panel 306 to be uniformly extended and/or retracted from an inner housing of the user device 304.

In some aspects, as shown in FIG. 3B, the display extending component 318 includes a counter 340 and a counter element 342. The counter element 342 may be configured to obtain data associated with the rotation of the set of gears 328 and/or a roller 344. The roller 344 may be located in an inner portion of the roller housing section 310. The rollable display panel 306 may travel around the roller 344 as the rollable display panel 306 is extended and/or retracted. The counter element 342 may be configured to determine a quantity of rotations of the set of gears 328, a quantity of rotations of the roller 344, a rotational distance traveled by the set of gears 328, a rotational distance traveled by the roller 344, a portion of the second plurality of teeth 336 engaged by the gear teeth 334, and/or the like. The counter element 342 may provide the obtained data to the counter 340. The counter 340 may translate the obtained data into information indicating a quantity of rotations associated with the set of gears 328, a quantity of rotations associated with the roller 344, a size of the rollable display panel 306 extended from and/or retracted into the inner housing of the user device 304, and/or the like. The counter 340 may provide the information to the controller 316.

As indicated above, FIGS. 3A and 3B are provided as an example. Other examples may differ from what is described with respect to FIGS. 3A and 3B.

Figure 4A:
FIGS. 4A-4D are diagrams illustrating an example associated with management of a rollable display panel of a display device, in accordance with the present disclosure.
Figure 4B:
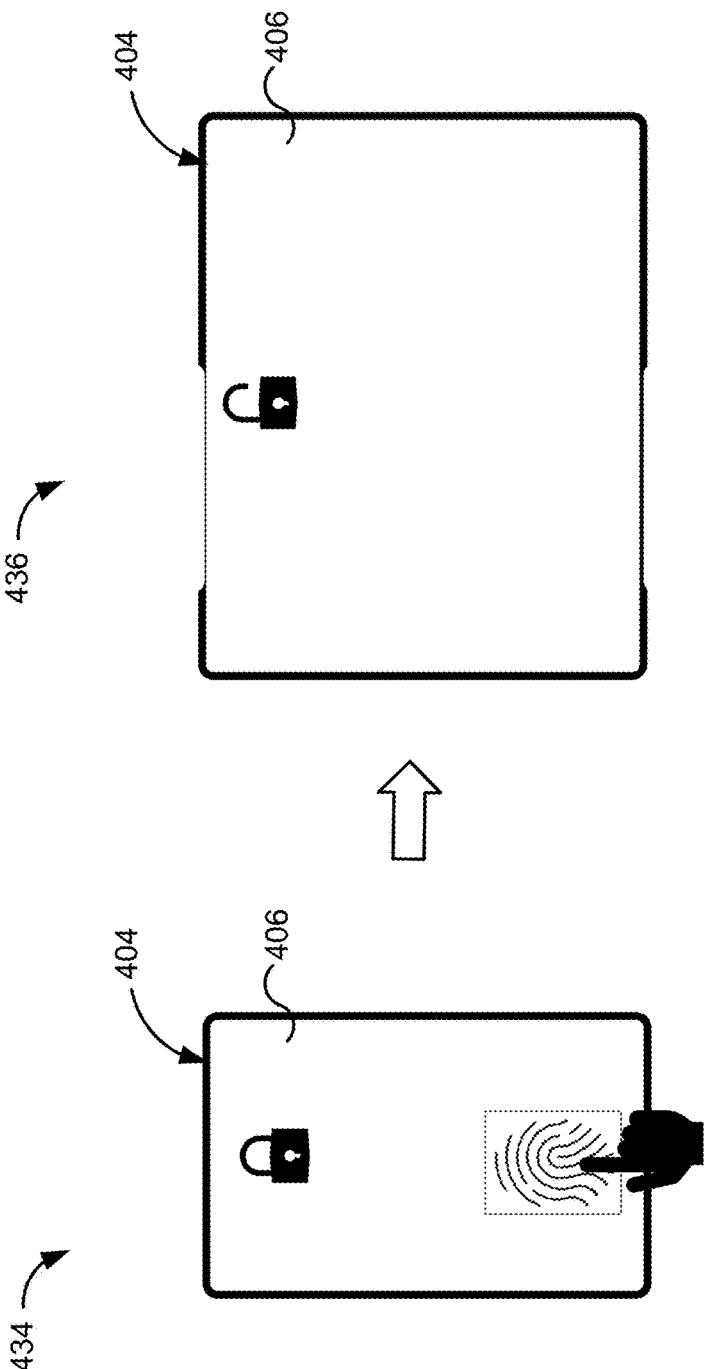

FIGS. 4A and 4B are diagrams illustrating an example 400 associated with management of a rollable display panel of a display device, in accordance with the present disclosure. As shown in FIGS. 4A and 4B, a user device 402 includes a rollable display device 404 (e.g., display device 112) which includes a rollable display panel 406. The rollable display device 404 may be referred to herein as a "display device." The user device 402 also includes a fingerprint acquisition component 408, a touch sensing component 410, a display extending component 412, and a controller 414. The controller 414 may be referred to as a "controller of the user device 402" and/or a "controller of the display device 404." In some aspects, the controller may control one or more functions of the user device in addition to controlling functions of the rollable display device 404. In some aspects, the controller 414 may include any one or more of the bus 205, the processor 210, the memory 215, the storage component 220, the input component 225, the output component 230, and/or the communication interface 235 depicted in FIG. 2.

As shown in FIG. 4A, a user may (e.g., using a digit of the user's hand 416) interact with a contact area 418 of the display device 404. In some aspects, for example, the controller 414 may output representation information that facilitates presentation of a representation 420 corresponding to the contact area 418 on the display device 404. The representation 420 may be, for example, a virtual button presented on a user interface (e.g., a graphical user interface (GUI)) that is presented on the display device 404. As shown by reference number 422, the controller 414 may obtain, by the fingerprint acquisition component 408, fingerprint information associated with the user interaction. For example, the controller 414 may obtain, by the fingerprint acquisition component 408, an image of a fingerprint or a partial fingerprint associated with the digit of the user's hand 416. As shown by reference number 424, the controller 414 may obtain, by the touch sensing component 410, touch information associated with the user interaction. For example, the controller 414 may obtain, by the touch sensing component 410, a force measurement associated with the user interaction and/or a gesture measurement associated with the user interaction.

As shown by reference number 426, the controller 414 may output mode information. The mode information may cause the display device 404 to transition from a first lock mode (indicated by the locked padlock icon, which may or may not be presented on the display device 404) to a second lock mode (shown by reference number 428 and indicated by the unlocked padlock icon, which may or may not be presented on the display device 404). In some aspects, the controller 414 may output the mode information based on the fingerprint information satisfying a fingerprint condition. For example, the fingerprint information may satisfy the fingerprint condition by satisfying an authentication condition associated with a biometric authentication procedure. In some aspects, as shown in FIG. 4A, the display device 404 is not transitioned to a second extension state based on the touch information failing to satisfy a touch condition. The touch information may fail to satisfy the touch condition based on a force measurement failing to satisfy a force threshold.

As shown by reference number 430, the controller 414 may output actuation information. The controller 414 may output the actuation information based on the fingerprint information and the touch information, and the actuation information may cause actuation of the display extending component 412 of the display device 404 to change an extension state of the display device 404. For example, as shown in example 432 of FIG. 4B, the actuation information may cause the display extending component 412 to change an extension state from a first extension state, shown by reference number 434, to a second extension state shown by reference number 436. As shown, for example, the first extension state may be an unextended state and the second extension state may be an extended state. In some aspects, the controller 414 may output the actuation information based on the touch information satisfying a touch condition. For example, the touch information may satisfy the touch condition based on a force measurement satisfying a force threshold and/or a gesture measurement satisfying a gesture threshold. A gesture measurement may satisfy a gesture threshold based on a detected moving touch extending at least a minimum distance in a defined direction. For example, a left swipe may be detected based on a moving touch extending at least a minimum distance toward the left (or at least partially toward the left), while a right swipe may be detected based on a moving touch extending at least a minimum distance toward the right (or at least partially toward the right).

Figures 4C, 4D:
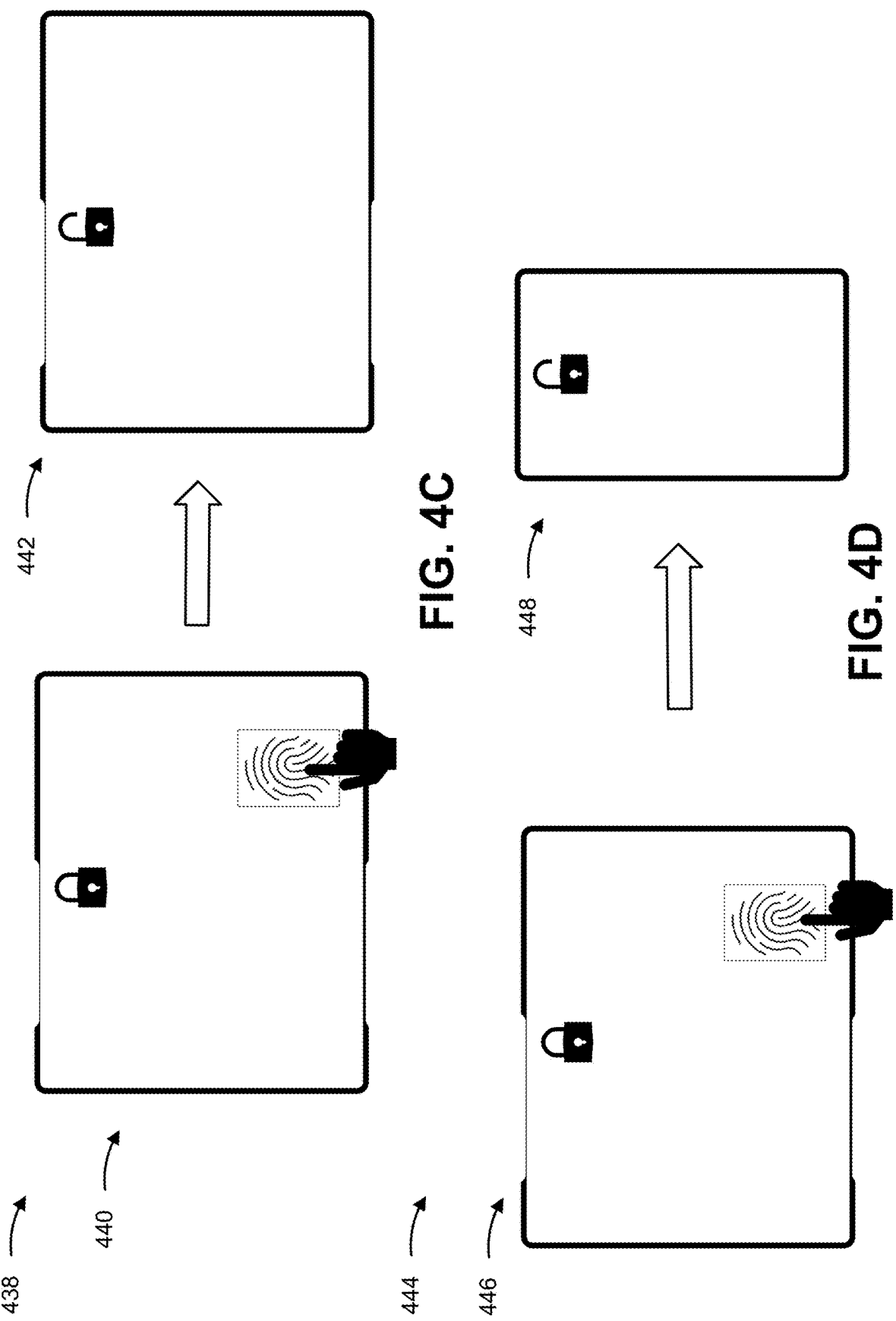

In the example 432 of FIG. 4B, the fingerprint information also may satisfy the fingerprint condition and the controller 414 may output mode information to change the lock mode of the user device 402 (e.g., from a locked mode to an unlocked mode). In the example 438 of FIG. 4C, as shown by reference number 440, the user device 402 may be in an extended state and the fingerprint information may satisfy the fingerprint condition, while the touch information fails to satisfy the touch condition. As a result, as shown by reference number 442, the lock mode of the user device 402 may change while the extension state remains unchanged. In the example 444 of FIG. 4D, as shown by reference number 446, the user device 402 may be in an extended state. The fingerprint information may satisfy the fingerprint condition and the touch information may satisfy the touch condition. As a result, as shown by reference number 448, both the lock mode and extension state of the user device 402 may be changed. Any number of combinations of resulting state and/or mode changes may be associated with any number of fingerprint and/or touch conditions, all of which are considered to be within the ambit of the present disclosure.

As indicated above, FIGS. 4A-4D are provided as an example. Other examples may differ from what is described with respect to FIGS. 4A-4D.

FIG. 5 is a diagram illustrating an example process 500 performed, for example, by a controller, in accordance with the present disclosure. Example process 500 is an example where the controller (e.g., controller 414) performs operations associated with controlling a rollable display device based on fingerprint information and touch information.

As shown in FIG. 5, in some aspects, process 500 may include obtaining fingerprint information associated with a user interaction with a contact area of the rollable display device (block 510). For example, the controller (e.g., using the fingerprint acquisition component 408) may obtain fingerprint information associated with a user interaction with a contact area of the rollable display device, as described above.

As further shown in FIG. 5, in some aspects, process 500 may include obtaining touch information associated with the user interaction with the contact area of the rollable display device (block 520). For example, the controller (e.g., using the touch sensing component 410) may obtain touch information associated with the user interaction with the contact area of the rollable display device, as described above.

As further shown in FIG. 5, in some aspects, process 500 may include outputting, based on the fingerprint information and the touch information, actuation information that causes actuation of a display extending component of the rollable display device to change an extension state of the rollable display device (block 530). For example, the controller may output, based on the fingerprint information and the touch information, actuation information that causes actuation of a display extending component of the rollable display device to change an extension state of the rollable display device, as described above.

Process 500 may include additional aspects, such as any single aspect or any combination of aspects described below and/or in connection with one or more other processes described elsewhere herein.

In a first aspect, process 500 includes outputting representation information that facilitates presentation of a virtual button on a user interface associated with the rollable display device, wherein the virtual button corresponds to the contact area. In a second aspect, alone or in combination with the first aspect, outputting the actuation information comprises outputting the actuation information based on the touch information satisfying a touch condition. In a third aspect, alone or in combination with the first and second aspects, the touch information comprises a force measurement associated with the user interaction with the contact area, and the touch information satisfies the touch condition based on the force measurement satisfying a force threshold.

In a fourth aspect, alone or in combination with one or more of the first through third aspects, the actuation information causes actuation of the display extending component to change the extension state from an unextended state to an extended state. In a fifth aspect, alone or in combination with one or more of the first through third aspects, the actuation information causes actuation of the display extending component to change the extension state from an extended state to an unextended state.

In a sixth aspect, alone or in combination with one or more of the first through fifth aspects, process 500 includes outputting mode information that causes the rollable display device to transition from a first lock mode to a second lock mode. In a seventh aspect, alone or in combination with one or more of the first through sixth aspects, outputting the mode information comprises outputting the mode information based on the fingerprint information satisfying a fingerprint condition. In an eighth aspect, alone or in combination with one or more of the first through seventh aspects, the rollable display device comprises a rollable display panel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method for controlling a rollable display device, comprising: obtaining, by a fingerprint acquisition component of the rollable display device, fingerprint information associated with a user interaction with a contact area of the rollable display device; obtaining, by a touch sensing component of the rollable display device, touch information associated with the user interaction with the contact area of the rollable display device; and outputting, based on the fingerprint information and the touch information, actuation information that causes actuation of a display extending component of the rollable display device to change an extension state of the rollable display device.

Aspect 2: The method of Aspect 1, further comprising outputting representation information that facilitates presentation of a virtual button on a user interface associated with the rollable display device, wherein the virtual button corresponds to the contact area.

Aspect 3: The method of either of claim 1 or 2, wherein outputting the actuation information comprises outputting the actuation information based on the touch information satisfying a touch condition.

Aspect 4: The method of Aspect 3, wherein the touch information comprises a force measurement associated with the user interaction with the contact area, and wherein the touch information satisfies the touch condition based on the force measurement satisfying a force threshold.

Aspect 5: The method of any of Aspects 1-4, wherein the actuation information causes actuation of the display extending component to change the extension state from an unextended state to an extended state.

Aspect 6: The method of any of Aspects 1-4, wherein the actuation information causes actuation of the display extending component to change the extension state from an extended state to an unextended state.

Aspect 7: The method of any of Aspects 1-6, further comprising outputting mode information that causes the rollable display device to transition from a first lock mode to a second lock mode.

Aspect 8: The method of Aspect 7, wherein outputting the mode information comprises outputting the mode information based on the fingerprint information satisfying a fingerprint condition.

Aspect 9: The method of any of Aspects 1-8, wherein the rollable display device comprises a rollable display panel.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A controller of a user device for wireless communication, the user device comprising a rollable display device, comprising:

a memory; and one or more processors coupled to the memory and configured to cause the controller to:

obtain fingerprint information associated with a user interaction with a contact area of the rollable display device;

obtain touch information associated with the user interaction with the contact area of the rollable display device; and output, based on the fingerprint information and the touch information, actuation information that causes actuation of a display extending component of the rollable display device to change an extension state of the rollable display device, wherein the display extending component comprises a mechanical device that is actuated to one or more of extend or retract a rollable display panel of the rollable display device, and wherein the mechanical device comprises a motor that is calibrated to enable the rollable display panel to be extended at a particular rate.

2. The controller of claim 1, wherein the one or more processors are further configured to cause the controller to output representation information that facilitates presentation of a virtual button on a user interface associated with the rollable display device, wherein the virtual button corresponds to the contact area.

3. The controller of claim 1, wherein the one or more processors, to cause the controller to output the actuation information, are configured to cause the controller to output the actuation information based on the touch information satisfying a touch condition.

4. The controller of claim 3, wherein the touch information comprises a force measurement associated with the user interaction with the contact area, and wherein the touch information satisfies the touch condition based on the force measurement satisfying a force threshold.

5. The controller of claim 3, wherein the touch information comprises a gesture measurement associated with the user interaction with the contact area, and wherein the touch information satisfies the touch condition based on the gesture measurement satisfying a gesture threshold.

6. The controller of claim 1, wherein the actuation information causes actuation of the display extending component to change the extension state from an unextended state to an extended state.

7. The controller of claim 1, wherein the actuation information causes actuation of the display extending component to change the extension state from an extended state to an unextended state.

8. The controller of claim 1, wherein the one or more processors are further configured to cause the controller to output mode information that causes the rollable display device to transition from a first lock mode to a second lock mode.

9. The controller of claim 8, wherein the one or more processors, to cause the controller to output the mode information, are configured to cause the controller to output the mode information based on the fingerprint information satisfying a fingerprint condition.

10. The controller of claim 1, wherein the rollable display device comprises the rollable display panel, and wherein the mechanical device is calibrated to enable a lower edge of the rollable display panel and an upper edge of the rollable display panel to extend at the particular rate.

11. A method for controlling a rollable display device, comprising:

obtaining, by a fingerprint acquisition component of the rollable display device, fingerprint information associated with a user interaction with a contact area of the rollable display device;

obtaining, by a touch sensing component of the rollable display device, touch information associated with the user interaction with the contact area of the rollable display device; and outputting, based on the fingerprint information and the touch information, actuation information that causes actuation of a display extending component of the rollable display device to change an extension state of the rollable display device, wherein the display extending component comprises a mechanical device that is actuated to one or more of extend or retract a rollable display panel of the rollable display device, and wherein the mechanical device comprises a motor that is calibrated to enable the rollable display panel to be extended at a particular rate.

12. The method of claim 11, further comprising outputting representation information that facilitates presentation of a virtual button on a user interface associated with the rollable display device, wherein the virtual button corresponds to the contact area.

13. The method of claim 11, wherein outputting the actuation information comprises outputting the actuation information based on the touch information satisfying a touch condition.

14. The method of claim 13, wherein the touch information comprises a force measurement associated with the user interaction with the contact area, and wherein the touch information satisfies the touch condition based on the force measurement satisfying a force threshold.

15. The method of claim 11, wherein the actuation information causes actuation of the display extending component to change the extension state from an unextended state to an extended state.

16. The method of claim 11, wherein the actuation information causes actuation of the display extending component to change the extension state from an extended state to an unextended state.

17. The method of claim 11, further comprising outputting mode information that causes the rollable display device to transition from a first lock mode to a second lock mode.

18. The method of claim 17, wherein outputting the mode information comprises outputting the mode information based on the fingerprint information satisfying a fingerprint condition.

19. The method of claim 11, wherein the rollable display device comprises the rollable display panel, and wherein the mechanical device is calibrated to enable a lower edge of the rollable display panel and an upper edge of the rollable display panel to extend at the particular rate.

20. A non-transitory computer-readable medium storing a set of instructions for wireless communication, the set of instructions comprising:

one or more instructions that, when executed by one or more processors of a controller of a user device having a rollable display device, cause the controller to:

obtain fingerprint information associated with a user interaction with a contact area of the rollable display device;

obtain touch information associated with the user interaction with the contact area of the rollable display device; and output, based on the fingerprint information and the touch information, actuation information that causes actuation of a display extending component of the rollable display device to change an extension state of the rollable display device, wherein the display extending component comprises a mechanical device that is actuated to one or more of extend or retract a rollable display panel of the rollable display device, and wherein the mechanical device comprises a motor that is calibrated to enable the rollable display panel to be extended at a particular rate.

21. The non-transitory computer-readable medium of claim 20, wherein the one or more instructions further cause the controller to output representation information that facilitates presentation of a virtual button on a user interface associated with the rollable display device, wherein the virtual button corresponds to the contact area.

22. The non-transitory computer-readable medium of claim 20, wherein the one or more instructions, that cause the controller to output the actuation information, cause the controller to output the actuation information based on the touch information satisfying a touch condition.

23. The non-transitory computer-readable medium of claim 22, wherein the touch information comprises a force measurement associated with the user interaction with the contact area, and wherein the touch information satisfies the touch condition based on the force measurement satisfying a force threshold.

24. The non-transitory computer-readable medium of claim 20, wherein the actuation information causes actuation of the display extending component to change the extension state from an unextended state to an extended state.

25. The non-transitory computer-readable medium of claim 20, wherein the actuation information causes actuation of the display extending component to change the extension state from an extended state to an unextended state.

26. The non-transitory computer-readable medium of claim 20, wherein the one or more instructions further cause the controller to output mode information that causes the rollable display device to transition from a first lock mode to a second lock mode.

27. The non-transitory computer-readable medium of claim 26, wherein the one or more instructions, that cause the controller to output the mode information, cause the controller to output the mode information based on the fingerprint information satisfying a fingerprint condition.

28. The non-transitory computer-readable medium of claim 20, wherein the rollable display device comprises the rollable display panel, and wherein the mechanical device is calibrated to enable a lower edge of the rollable display panel and an upper edge of the rollable display panel to extend at the particular rate.

29. An apparatus for wireless communication, comprising:

means for obtaining fingerprint information associated with a user interaction with a contact area of a rollable display device of the apparatus;

means for obtaining touch information associated with the user interaction with the contact area of the rollable display device; and means for outputting, based on the fingerprint information and the touch information, actuation information that causes actuation of a display extending component of the rollable display device to change an extension state of the rollable display device, wherein the display extending component comprises a mechanical device that is actuated to one or more of extend or retract a rollable display panel of the rollable display device, and wherein the mechanical device comprises a motor that is calibrated to enable the rollable display panel to be extended at a particular rate.

30. The apparatus of claim 29, further comprising:

means for outputting representation information that facilitates presentation of a virtual button on a user interface associated with the rollable display device, wherein the virtual button corresponds to the contact area.

\* \* \* \* \*